United States Patent

[11] 3,587,802

| [72] | Inventor | Edward N. Pink<br>7570 Woodman Place, Van Nuys, Calif. 91405 |
|---|---|---|
| [21] | Appl. No. | 812,209 |
| [22] | Filed | Apr. 1, 1969 |
| [45] | Patented | June 28, 1971 |

[54] APPARATUS FOR ADJUSTING PRESSURE PLATE SPRING TENSION
1 Claim, 4 Drawing Figs.

[52] U.S. Cl. .................................................... 192/89,
192/70.26, 192/111
[51] Int. Cl. .................................................... F16d 13/75
[50] Field of Search ........................................... 192/111,
111 (B), 70.26, 110, 99 (A), 89

[56] References Cited
UNITED STATES PATENTS

| 1,338,252 | 4/1920 | Ralls | 192/89X |
| 1,524,770 | 2/1925 | Wood | 192/70.26 |
| 2,077,154 | 4/1937 | Pearmain | 192/89X |
| 2,589,308 | 3/1952 | Thelander | 192/70.26 |

*Primary Examiner*—Benjamin W. Wyche
*Attorney*—Spensley, Horn & Lubitz

ABSTRACT: A means for adjusting the force with which the pressure plate in a clutch assembly engages the clutch disc. A member suitable for use in existing clutch assemblies is utilized for adjusting the springs that force the pressure plate against the clutch disc. The springs may be manually adjusted without disassembling the clutch assembly.

PATENTED JUN 28 1971
3,587,802
*Fig.1*
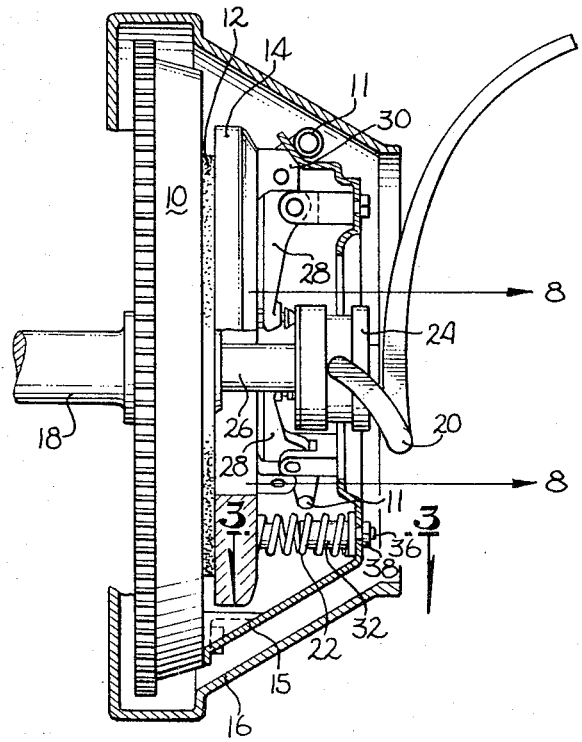
*Fig.2*
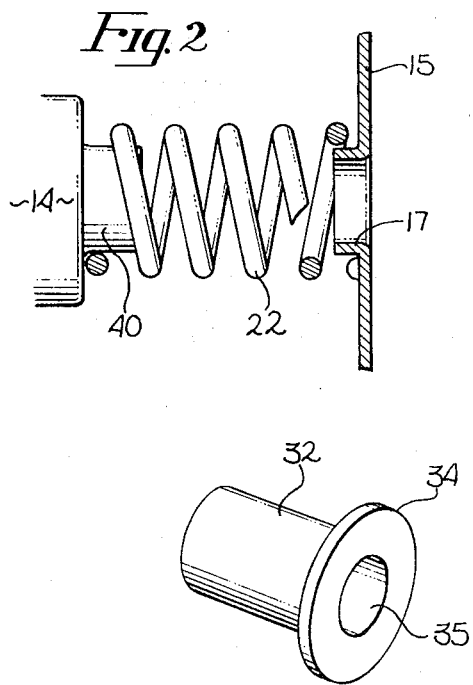
*Fig.3*
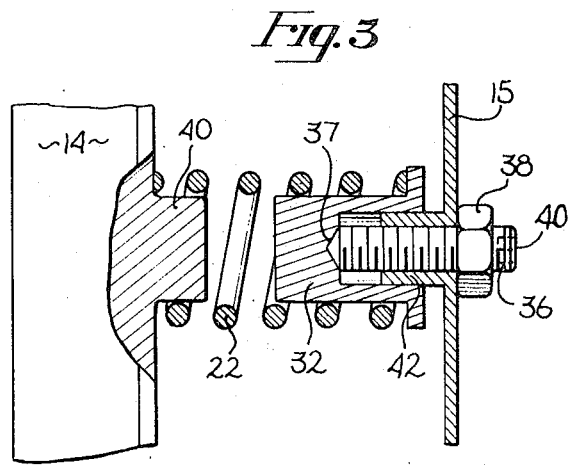
*Fig.4*
EDWARD N. PINK
INVENTOR.
BY Spensley & Horn
ATTORNEYS

APPARATUS FOR ADJUSTING PRESSURE PLATE SPRING TENSION

BACKGROUND OF THE INVENTION

1. Field of the Invention

The invention relates to the field of adjustable spring forces on pressure plates in clutch assemblies.

2. Prior Art

In clutch assemblies, such as are used in automobiles, a pressure plate is forced against a clutch disc by springs causing the disc and pressure plate to rotate with the engine's flywheel. The spring force with which the pressure plate engages the clutch disc is constant and may not be varied. It is desirable in some applications to have a means for varying this force. For example, when an automobile is used for competitive sports such as drag racing, it is desirable to have a different spring force than that suitable for driving the same vehicle on public highways.

In the prior art, no expedient means exist for adjusting the spring force with which the pressure plate engages the clutch disc. Prior art adjustments consist primarily of schemes which compensate for clutch disc wear.

SUMMARY OF THE INVENTION

A member is utilized to engage the springs which force the pressure plate against the clutch disc. The member also engages a threaded bolt. Threaded means are provided in the clutch cover allowing the bolt to force the member toward the pressure plate thereby increasing the force with which the pressure plate engages the clutch disc.

It is an object of this invention to provide a means for varying the force with which a pressure plate engages a clutch disc.

It is still a further object of this invention to provide means for modifying existing clutch assemblies so that the force with which the pressure plate engages the clutch disc may be manually adjusted.

It is still a further object of this invention to provide means for changing the pressure plate spring force without disassembling the clutch assembly.

Other objects and advantages of the present invention will be apparent from the following specification when considered in conjunction with the accompanying drawings.

BRIEF DESCRIPTION OF THE DRAWINGS

FIG. 1 is a view partially in cross section of an illustrative clutch assembly including apparatus of the present invention in its presently preferred form.

FIG. 2 illustrates the prior art method of applying force to the pressure plate.

FIG. 3 is a partial section of a clutch assembly of the present invention taken along line 3–3 of FIG. 1.

FIG. 4 is a perspective view of the member utilized in the assemblies shown in FIG. 1 and FIG. 3.

DETAILED DESCRIPTION OF THE INVENTION

Referring now to the drawing and particularly to FIG. 1, an illustrative clutch assembly including the apparatus of the present invention is shown as housed within housing 16. Flywheel 10 is driven by shaft 18 which is typically coupled to the crankshaft of a combustion engine (not shown). The transmitted power, which is interrupted by the clutch assembly, is transmitted from shaft 18 to shaft 26. In the most common application of the illustrated clutch assembly, the shaft 26, which is coupled to the clutch disc 12, is in turn coupled to an automobile transmission.

When the clutch is engaged, pressure plate 14 forces the clutch disc 12 against the flywheel 10. This force is produced by a plurality of springs 22. Typically, such springs are utilized although only one such spring 22 appears in FIG. 1 because of the perspective of that view. Such springs are typically axially compressible helical springs and are shown as such. When pressure plate 14 engages clutch disc 12, as is illustrated in FIG. 1, no relative rotation occurs between shaft 18 and shaft 26.

Clutch disc 12 disengages flywheel 10 and pressure plate 14 when pressure plate 14 moves in the direction indicated by arrows 8. This occurs when a force is applied to linkage 20 causing throwout bearing 24 to press against lever arms 28. The lever arms 28 are hingingly mounted to pressure plate 14 at yokes 30. As the throwout bearing 26 moves in the direction indicated by arrow 9, members 11 of lever arms 28 press against the clutch cover 15, causing the pressure plate to move in the direction of arrows 8, thereby disengaging the clutch disc. When this occurs, no power is transmitted from shaft 18 to shaft 26.

Springs 22 provide the entire force with which the pressure plate 14 engages the clutch disc 12. When pressure plate 14 moves in the direction of arrow 9 prior to engaging clutch disc 12, its rate of movement is also a function of the force produced by springs 22. In existing clutch assemblies, this force is constant since no means are readily available for varying or adjusting springs 22. When greater spring force is required for faster acceleration, for example, it is necessary in the present state of the art to disassemble the clutch housing and replace the springs.

Referring to FIG. 2, spring 22 is shown engaging cover 15 and pressure plate 14. Typically, a boss such as boss 17 is stamped into cover 15 to provide a seat for securing spring 22 against cover 15. A similar boss 40 is made a part of pressure plate 14 to secure spring 22 against pressure plate 14. In the present invention, the forces applied by springs 22 are made manually adjustable without disassembling the clutch assembly.

As shown particularly in FIGS. 1, 3 and 4 in accordance with the presently preferred embodiment of the present invention, the clutch cover 15 is provided with an internally threaded opening coextensive with each of the springs 22. Such opening is defined by a threaded boss or by a threaded sleeve 42 as shown in FIG. 3. Sleeve 42 is welded or brazed to cover 15 or rigidly held in place on cover 15 by any one of other well-known fastening means. Sleeve 42 is preferably made of metal such as steel.

A spring engaging member 32 is cooperatively engaged with each of the springs 22 and is adapted to be moved within the housing along the axis of the spring. Thus, referring to FIG. 4, in its presently preferred embodiment, the spring engaging member has a generally cylindrical shape with a transverse shoulder 34 and an inside bore 35 utilized to engage spring 22. Member 32 is preferably made of metal such as aluminum or steel. The outside diameter of the member 32 is mateable with the inside of spring 22 as shown in FIGS. 1 and 3. Shoulder 34 has an outside diameter sufficiently large to provide a bearing face to engage spring 22. The inside bore 35 of member 32 is large enough so that it will receive bolt 36.

Bolt 36 and nut 38 as shown in FIGS. 1 and 3 may be a commonly utilized bolt and nut. Bolt 36 is capable of threadingly engaging sleeve 42 and nut 38. In addition, bolt 36 fits within bore 35 of member 32 and seats in the member 32 at the end of bore 35 as indicated by seat 37 in FIG. 3.

As shown in FIG. 3, member 32 is moved towards pressure plate 14 along the axis of the spring 22 by adjusting bolt 36 within sleeve 42. When this is done, spring 22 is compressed, thereby increasing the force with which pressure plate 14 engages clutch disc 12. This additional force also increases the rate at which pressure plate 14 moves towards disc 12 once the force applied to throwout bearing 24 by linkage 20 is removed. Thus, in addition to applying a great force when pressure plate 14 is engaging disc 12, the additional spring force causes a quicker engagement of the clutch disc. Conversely, the compression is, of course, lessened by threading the bolt outwardly which allows the spring to expand and move the member toward the cover 15. Note that member 32 should extend into spring 22 far enough to allow only axial compression of spring 22 and to prevent bowing of spring 22.

In order to adjust or vary the forces provided by springs 22, with the apparatus of this invention, bolt 36 is adjusted within sleeve 42. Once the adjustment has been accomplished, bolt 36 is secured in place by tightening nut 38 against cover 15. The adjustment can easily be accomplished as by adapting the outer end 40 of bolt 36 to receive a standard tool such as an Allen wrench.

Thus, by means of sleeve 42, spring compression member 32, bolt 36 and nut 38, the forces caused by springs 22 are adjustable. This adjustment typically can be made with ordinary tools, without disassembling the clutch assembly. In addition, the above described improvement is readily adaptable to many standard clutch assemblies.

Although this invention has been disclosed and illustrated with reference to particular applications, the principles involved are susceptible of numerous other applications which will be apparent to persons skilled in the art. The invention, therefore, is to be limited only as indicated by the scope of the appended claims.

I claim:

1. In a clutch assembly having a flywheel, clutch disc, pressure plate and a cover, where said clutch disc is engaged between said flywheel and said pressure plate, and said pressure plate is forced against said clutch disc by a plurality of axially compressible springs located between said cover and said pressure plate, an apparatus in combination with said clutch assembly comprising:
   a plurality of spring compression members each engage one of said springs and each having a shoulder at one end, said shoulder suitable for engaging said spring and an inside bore, said spring compression members being movable along the axis of said spring and in engagement therewith;
   threaded means located in said cover suitable for engaging a bolt means;
   bolt means for engaging said threaded means and said inside bore of said spring compression means; and
   whereby when said bolt is adjusted within said cover the force with which the pressure plate engages the clutch disc is manually adjusted.